(12) United States Patent
Abe

(10) Patent No.: US 8,041,995 B2
(45) Date of Patent: Oct. 18, 2011

(54) METHOD AND SYSTEM FOR RESETTING FAULT TOLERANT COMPUTER SYSTEM

(75) Inventor: Shinji Abe, Tokyo (JP)

(73) Assignee: NEC Corporation, Tokyo (JP)

( * ) Notice: Subject to any disclaimer, the term of this patent is extended or adjusted under 35 U.S.C. 154(b) by 999 days.

(21) Appl. No.: 11/304,575

(22) Filed: Dec. 16, 2005

(65) Prior Publication Data
US 2006/0150024 A1 Jul. 6, 2006

(30) Foreign Application Priority Data
Dec. 20, 2004 (JP) ................................. 2004-367749

(51) Int. Cl.
*G06F 11/00* (2006.01)
(52) U.S. Cl. ......................................................... 714/23
(58) Field of Classification Search .................... 714/23, 714/38
See application file for complete search history.

(56) References Cited

U.S. PATENT DOCUMENTS

| | | | | | |
|---|---|---|---|---|---|
| 4,803,682 | A | * | 2/1989 | Hara et al. ......................... | 714/23 |
| 5,251,227 | A | | 10/1993 | Bruckert et al. | |
| 5,377,205 | A | * | 12/1994 | Shi ................................. | 714/797 |
| 5,537,655 | A | * | 7/1996 | Truong ........................... | 714/12 |
| 5,737,513 | A | * | 4/1998 | Matsuda et al. ................. | 714/11 |
| 5,884,018 | A | * | 3/1999 | Jardine et al. ..................... | 714/4 |
| 5,890,003 | A | * | 3/1999 | Cutts et al. ..................... | 710/263 |
| 6,141,769 | A | | 10/2000 | Petivan et al. | |
| 6,393,582 | B1 | * | 5/2002 | Klecka et al. ................... | 714/11 |
| 6,480,966 | B1 | * | 11/2002 | Rawson, III .................... | 713/400 |
| 7,111,196 | B2 | * | 9/2006 | Balazich et al. ................ | 714/13 |
| 7,251,748 | B2 | * | 7/2007 | Liberty et al. .................. | 714/20 |
| 2001/0025352 | A1 | | 9/2001 | Ghameshlu et al. | |
| 2002/0124202 | A1 | * | 9/2002 | Doody et al. ...................... | 714/5 |
| 2004/0153857 | A1 | * | 8/2004 | Yamazaki et al. .............. | 714/43 |

FOREIGN PATENT DOCUMENTS

| | | |
|---|---|---|
| DE | 19832060 A1 | 1/2000 |
| JP | 07-073059 | 3/1995 |
| JP | 09-128258 | 5/1997 |

* cited by examiner

*Primary Examiner* — Scott Baderman
*Assistant Examiner* — Yair Leibovich
(74) *Attorney, Agent, or Firm* — Foley & Lardner LLP

(57) ABSTRACT

There is disclosed a method capable of resetting a fault tolerant computer in complete synchronization among modules. The method includes a step of generating a reset requesting signal by one of the modules, a step of dividing the reset requesting signal to first and second reset requesting signals, a step of transmitting the second reset requesting signal to the other module, a step of delaying the first reset requesting signal in the one module by a time required for transmitting the second reset requesting signal to the other module, a step of resetting at least one CPU included in the one module by a first CPU reset signal generated based on the first reset requesting signal delayed in the one module, and a step of resetting at least one CPU included in the other module by a second CPU reset signal generated based on the second reset requesting signal transmitted to the other module.

18 Claims, 11 Drawing Sheets

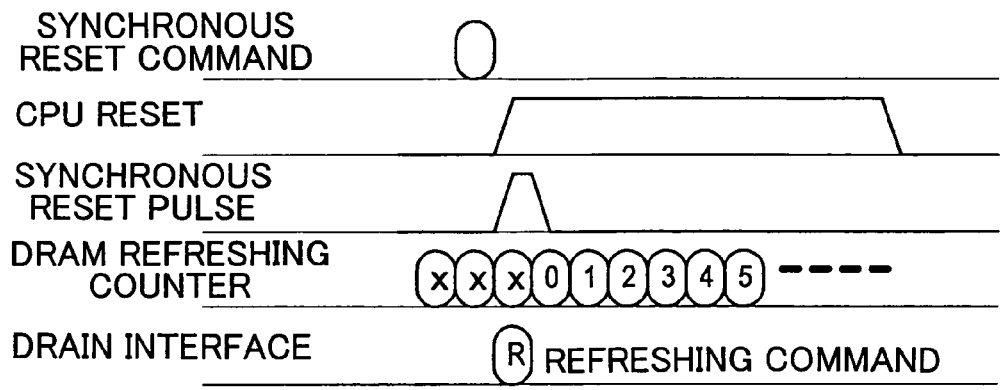
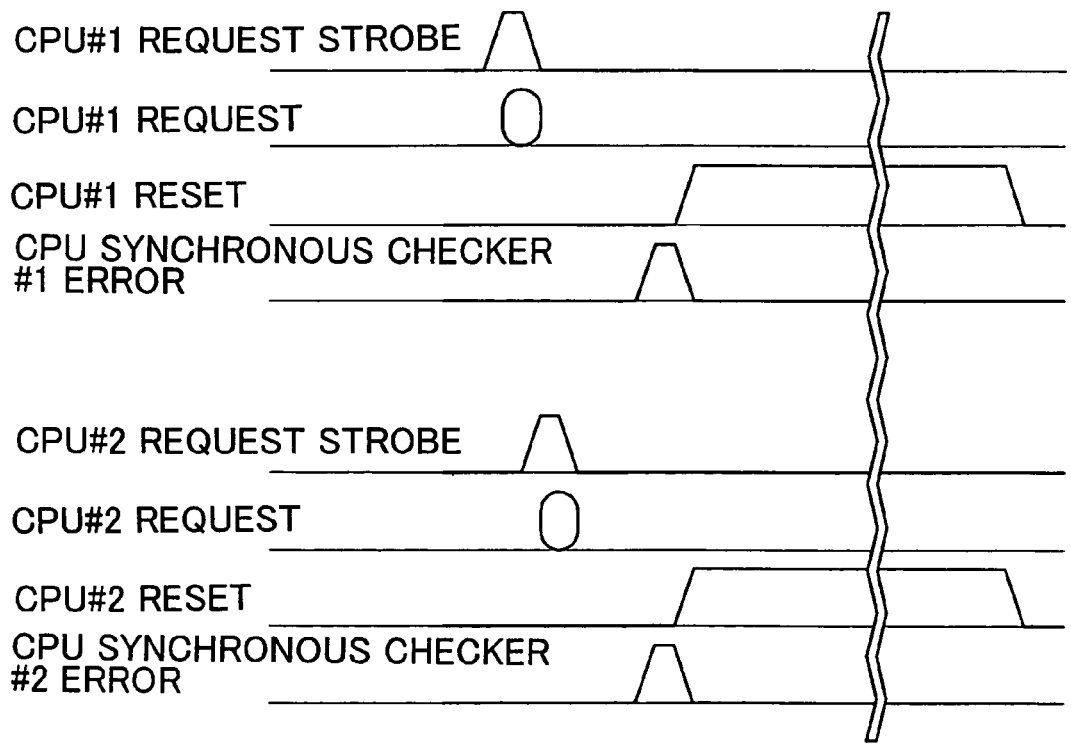

METHOD AND SYSTEM FOR RESETTING FAULT TOLERANT COMPUTER SYSTEM

BACKGROUND OF THE INVENTION

1. Field of the Invention

The present invention relates to a method and a system for resetting a fault tolerant computer system equipped with a plurality of modules.

2. Description of the Related Art

Regarding a computer that provides high reliability, there has conventionally been available a fault tolerant computer system. The fault tolerant computer duplexes or multiplexes hardware modules constituting a system to operate all the modules in synchronization, and cuts off a module to continue processing by a normal module even when a fault occurs in a certain area, thereby enhancing fault tolerance.

The fault tolerance computer basically includes hardware modules such as a CPU, a memory and an I/O device to be duplexed or triplexed, and a fault tolerance control section ("FT control section" hereinafter) connected to the modules to execute synchronous operation processing, switching control at the time of a fault, or the like. FIG. 1 shows an example of a system in which a CPU, a memory and an I/O device are duplexed. In the drawing, a CPU (group) 901 and a main memory 902 constitute one CPU subsystem 903-1, and it is duplexed with another CPU subsystem 903-2 of a completely identical configuration. Similarly, I/O devices (groups) of identical configurations are duplexed to constitute an I/O subsystem 904.

The FT control section is positioned in a center thereof to control the modules (CPU subsystems 903-1, 903-2, and I/O subsystem 904). It controls maintenance of synchronous operations of both CPU subsystems 903-1 and 903-2, detection of faults, and cutting-off of a fault module.

Generally, the fault tolerant computer is divided into a section for duplexing and controlling the modules by hardware and a section for duplexing and controlling the same by software.

For example, the CPU subsystem constituted of the CPU and the memory is itself a board on which software operates, and must be duplexed and controlled by hardware. Accordingly, when an error occurs in the CPU subsystem, the hardware (FT control section) cuts off the CPU or the memory from the system and executes control to prevent an influence on the CPU or the memory of a normal operation.

In FIG. 1, there are two CPU subsystems 903-1 and 903-2. A fault side is logically cut off by the FT control section, and an operation is continued by one CPU subsystem 903-1 (or 903-2) and the I/O subsystem 904.

On the other hand, when a fault occurs in the I/O device, the FT section that has detected the fault announces an error to software ("I/O device driver" hereinafter) for controlling the I/O device, whereby I/O device switching can be executed by the software. In this case, the I/O device driver cancels use of the fault I/O device, and uses another duplexed I/O device instead.

This means switching of I/O devices 905 to be used in the I/O subsystem 904.

The CPU subsystems 903-1, 903-2 of the fault tolerant computer must be operated by completely identical clocks, and it is important to achieve sameness in reset releasing timing for starting operations of the CPU's.

According to a conventional method, e.g., JP-A-9-128258 "Resynchronous Reset Processing Method of Computer System", an intersystem synchronization section connected to both processors simultaneously issues resets to CPU's.

According to a system described in JP-A-9-128258, it is easy to simultaneously issue resets to a plurality of CPU's as one intersystem control section issues resets. However, presence of only one intersystem synchronization section creates a risk that the system will not start when a fault occurs therein. Especially, since there is no mention of a case in which intersystem control sections are duplexed, how to simultaneously issue resets to CPU's is not described.

There are only a few other documents which specifically touch on synchronous reset control to a plurality of CPU's. A reason is that a CPU synchronization method uses not a reset but interruption synchronism as a starting point, for example, as described in JP-A-7-073059. For example, according to a method frequently used conventionally, an operating system or system software operating on a CPU stops at a certain check point, and a synchronous operation is started upon reception of an interruption input from a synchronous control section.

According to this method, however, an internal state of the CPU must be completely understood to guarantee that the internal state of the CPU is completely the same at the time of a stop at the check point. Otherwise, even when interruptions are simultaneously applied to the CPU's, enormous internal logics of the CPU's are not always maintained in the same state, and consequently synchronism of operations thereafter cannot be guaranteed.

That is, while the CPU is engaged in loop processing to wait for interruptions by the operating system or the system software, even in a CPU stopped state seen from the outside, many logics still operate in the CPU, such as processing of a loop command of the operating system or the system software, or system bus monitoring to wait for interruptions. In the CPU, prediction processing is carried out to achieve a high speed. However, prediction contents may vary from CPU to CPU. Furthermore, even a difference in refreshing timing or address of the main memory between the CPU subsystems may cause a variance in internal states of the CPU's.

In the old type CPU, the synchronization method that uses an interruption as a starting point may be effective. However, because of recent increases in size and complexity of internal logics of the CPU, it is virtually impossible to change the CPU that has started an operation to the completely identical state by software. To solve this problem, therefore, a method of completely synchronizing reset signals to reset all the internal logics of the CPU to input them to the CPU is the only way.

SUMMARY OF THE INVENTION

It is therefore an object of the present invention to provide a method and a system for resetting a fault tolerant computer, capable of resetting the fault tolerant computer in complete synchronization among modules.

According to a first aspect of the present invention, there is provided a method of resetting a fault tolerant computer equipped with a plurality of modules, comprising a step of generating a reset requesting signal by one of the modules; a step of dividing the reset requesting signal to first and second reset requesting signals; a step of transmitting the second reset requesting signal to the other module; a step of delaying the first reset requesting signal in the module by a time required for transmitting the second reset requesting signal to the other module; a step of resetting at least one CPU included in the one module by a first CPU reset signal generated based on the first reset requesting signal delayed in the one module; and a step of resetting at least one CPU included in the other module by a second CPU reset signal generated based on the second reset requesting signal transmitted to the other module.

The above method may further comprise a step of generating a locking command in the module; a step of transmitting the locking command to an I/O interface bridge of the one module; a step of transmitting the locking command to an I/O interface bridge of the other module; a step of locking an inbound request and generating first locking completion upon completion of returning of nonposted outbound request completion corresponding to all nonposted outbound requests before the locking command is received in the I/O interface bridge of the one module which has received the locking command; and a step of locking an inbound request and generating second locking completion upon completion of returning of nonposted outbound request completion corresponding to all nonposted outbound requests before the locking command is received in the I/O interface bridge of the other module which has received the locking command, wherein the reset requesting signal is generated upon generation of the first locking completion in the I/O interface bridge of the one module and the second locking completion in the I/O interface bridge of the other module.

The above method may further comprise a step of refreshing a main memory of the one module by a refreshing command and a refreshing counter reset signal generated based on the first reset requesting signal delayed in the one module; and a step of refreshing a main memory of the other module by a refreshing command and a refreshing counter reset signal generated based on the second reset requesting signal transmitted to the other module.

The above method may further comprise a step of determining matching of a command issued by at least one reset CPU included in the one module with a command issued by at least one reset CPU included in the other module; and a step of resetting at least one CPU included in the one module and at least one CPU included in the other module again when the commands do not match with each other.

The above method may further comprise a step of transmitting the command issued by at least one reset CPU included in the other module to the one module; and a step of delaying the command issued by at least one reset CPU included in the module by a time required for transmitting the command from the other module to the one module, wherein in the step of determining machining of the command issued by at least one reset CPU included in the one module with the command issued by at least one reset CPU included in the other module, determination is made as to matching of the command issued by at least one reset CPU included in the one module and delayed with the command issued by at least one reset CPU included in the other module and transmitted.

According to a second aspect of the present invention, there is provided a system for resetting a fault tolerant computer equipped with a plurality of modules, comprising means for generating a reset requesting signal by one of the modules; means for dividing the reset requesting signal to first and second reset requesting signals; means for transmitting the second reset requesting signal to the other module; means for delaying the first reset requesting signal in the module by a time required for transmitting the second reset requesting signal to the other module; means for resetting at least one CPU included in the one module by a first CPU reset signal generated based on the first reset requesting signal delayed in the one module; and means for resetting at least one CPU included in the other module by a second CPU reset signal generated based on the second reset requesting signal transmitted to the other module.

The above system may further comprise means for generating a locking command in the one module; means for transmitting the locking command to an I/O interface bridge of the one module; means for transmitting the locking command to an I/O interface bridge of the other module; means for locking an inbound request and generating first locking completion upon completion of returning of nonposted outbound request completion corresponding to all nonposted outbound requests before the locking command is received in the I/O interface bridge of the one module which has received the locking command; and means for locking an inbound request and generating second locking completion upon completion of returning of nonposted outbound request completion corresponding to all nonposted outbound requests before the locking command is received in the I/O interface bridge of the other module which has received the locking command, wherein the reset requesting signal is generated upon generation of the first locking completion in the I/O interface bridge of the one module and the second locking completion in the I/O interface bridge of the other module.

The above system may further comprise means for refreshing a main memory of the one module by a refreshing command and a refreshing counter reset signal generated based on the first reset requesting signal delayed in the one module; and means for refreshing a main memory of the other module by a refreshing command and a refreshing counter reset signal generated based on the second reset requesting signal transmitted to the other module.

The above system may further comprise means for determining matching of a command issued by at least one reset CPU included in the one module with a command issued by at least one reset CPU included in the other module; and means for resetting at least one CPU included in the one module and at least one CPU included in the other module again when the commands do not match with each other.

The above system may further comprise means for transmitting the command issued by at least one reset CPU included in the other module to the module; and means for delaying the command issued by at least one reset CPU included in the one module by a time required for transmitting the command from the other module to the one module, wherein in the means for determining machining of the command issued by at least one reset CPU included in the one module with the command issued by at least one reset CPU included in the other module, determination is made as to matching of the command issued by at least one reset CPU included in the one module and delayed with the command issued by at least one reset CPU included in the other module and transmitted.

According to a third aspect of the present invention, there is provided a fault tolerant controller used for a fault tolerant computer equipped with a plurality of modules, comprising reset requesting signal generation means for generating a reset requesting signal; dividing means for dividing the reset requesting signal to first and second reset requesting signals; transmission means for transmitting the second reset requesting signal to a fault tolerant controller included in a module other than a module which includes the controller; first delaying means for delaying the first reset requesting signal by a time required for transmitting the second reset requesting signal to the fault tolerant controller included in the module other than the module which includes the controller; and CPU resetting means for resetting at least one CPU included in the module which includes the controller by a first CPU reset signal generated based on the delayed first reset requesting signal.

The above controller may further comprise locking command generation means for generating a locking command; first locking command transmission means for transmitting the locking command to an I/O interface bridge included in the controller; second locking command transmission means for transmitting the locking command to an I/O interface bridge included in the fault tolerant controller included in the module other than the module which includes the controller; and locking completion generation means for locking an inbound request and generating first locking completion upon completion of returning of nonposted outbound request completion corresponding to all nonposted outbound requests before the locking command is received in the I/O interface bridge included in the controller, wherein the reset requesting signal generation means generates the reset requesting signal upon generation of the first locking completion in the I/O interface bridge included in the controller and second locking completion in the I/O interface bridge included in the fault tolerant controller.

The above controller may further comprise refreshing means for refreshing a main memory of the module which includes the controller by a refreshing command and a refreshing counter reset signal generated based on the first reset requesting signal delayed by the first delaying means.

The above controller may further comprise matching determination means for determining matching of a command issued by at least one reset CPU included in the module which includes the controller with a command issued by at least one reset CPU included in the module other than the module which includes the controller; and re-resetting means for resetting at least one CPU included in the module which includes the controller again when the commands do not match with each other.

The above controller may further comprise second delaying means for delaying the command issued by at least one reset CPU included in the module which includes the controller by a time required for transmitting the command from the module other than the module which includes the controller to the module which includes the controller, wherein the matching determination means determines matching of the command issued by at least one reset CPU included in the module which includes the controller and delayed by the second delaying means with the command issued by at least one reset CPU included in the module other than the module which includes the controller and transmitted.

According to the present invention, the first reset requesting signal is delayed in one module by a time required for transmitting the second reset requesting signal to the other module. As a result, it is possible to reset at least one CPU included in one module simultaneously with at least one CPU included in the other module.

BRIEF DESCRIPTION OF THE DRAWINGS

FIG. 12 is a timing chart showing a situation of resetting a DRAM by the CPU resetting method according to the embodiment of the present invention; and FIG. 13 is a timing chart showing a situation of detecting asynchronism by the CPU comparator to reset the CPU again according to the embodiment of the present invention.

DESCRIPTION OF THE PREFERRED
EMBODIMENTS

Next, the preferred embodiments of the present invention will be described in detail with reference to the accompanying drawings.

The CPU resetting method and system of the present invention input reset signals of multiplexed CPU subsystems to CPU's in complete synchronization to guarantee synchronous operations of the CPU's of the systems in a fault tolerant computer system. Recent CPU resetting employs asynchronous resetting not synchronized with a clock in many cases. Even when resetting is synchronously input on a clock basis, complete CPU synchronism may not be established. To deal with this situation, a mechanism is provided to monitor a request from a nearby CPU after reset releasing, and to immediately input resetting again when a timing shift is detected.

A reset controller is provided for each CPU subsystem, realizing a configuration of improved fault tolerance.

Figure 1:
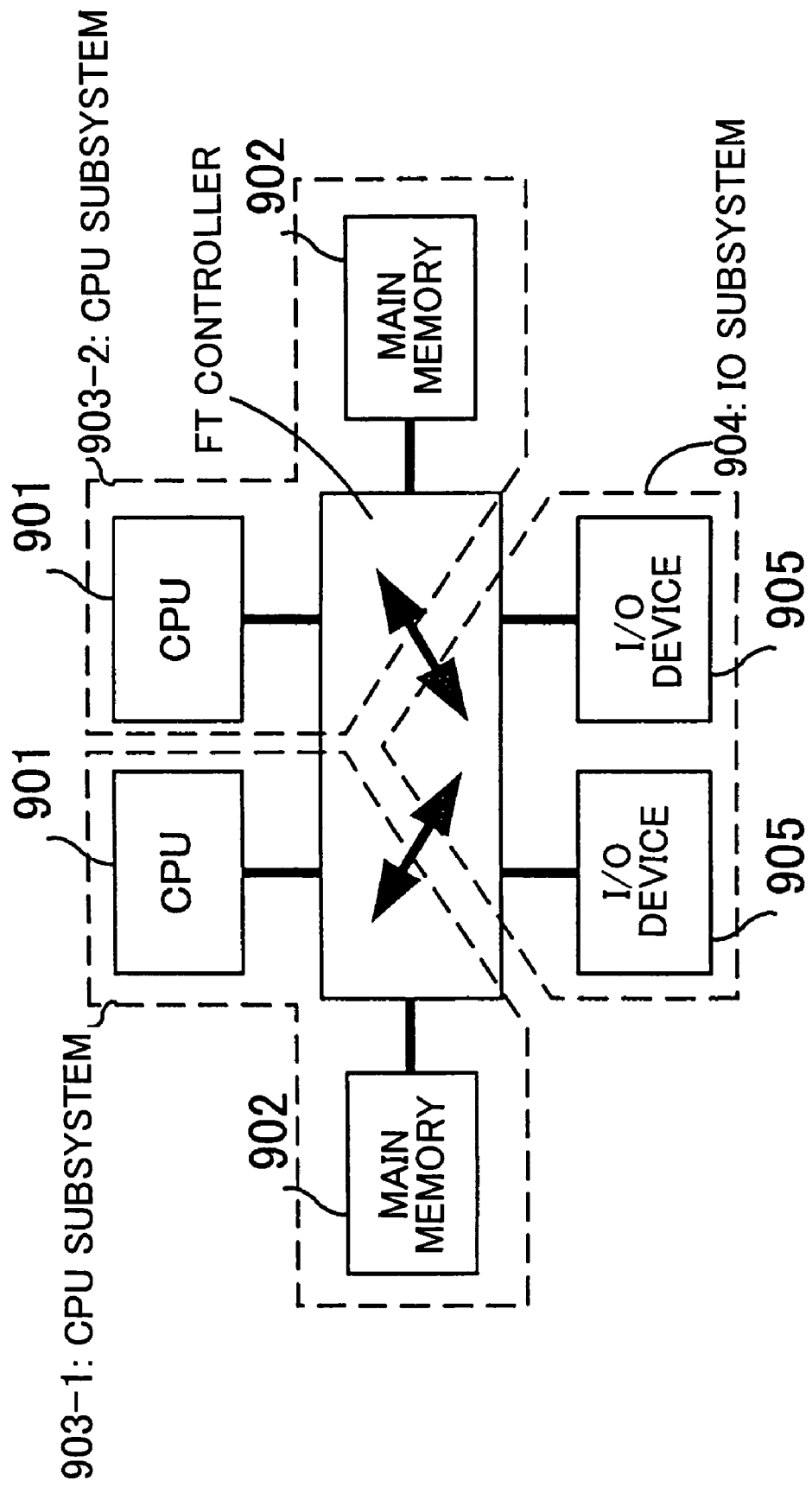
FIG. 1 is a block diagram showing a basic configuration of a fault tolerant computer.
Figure 2:
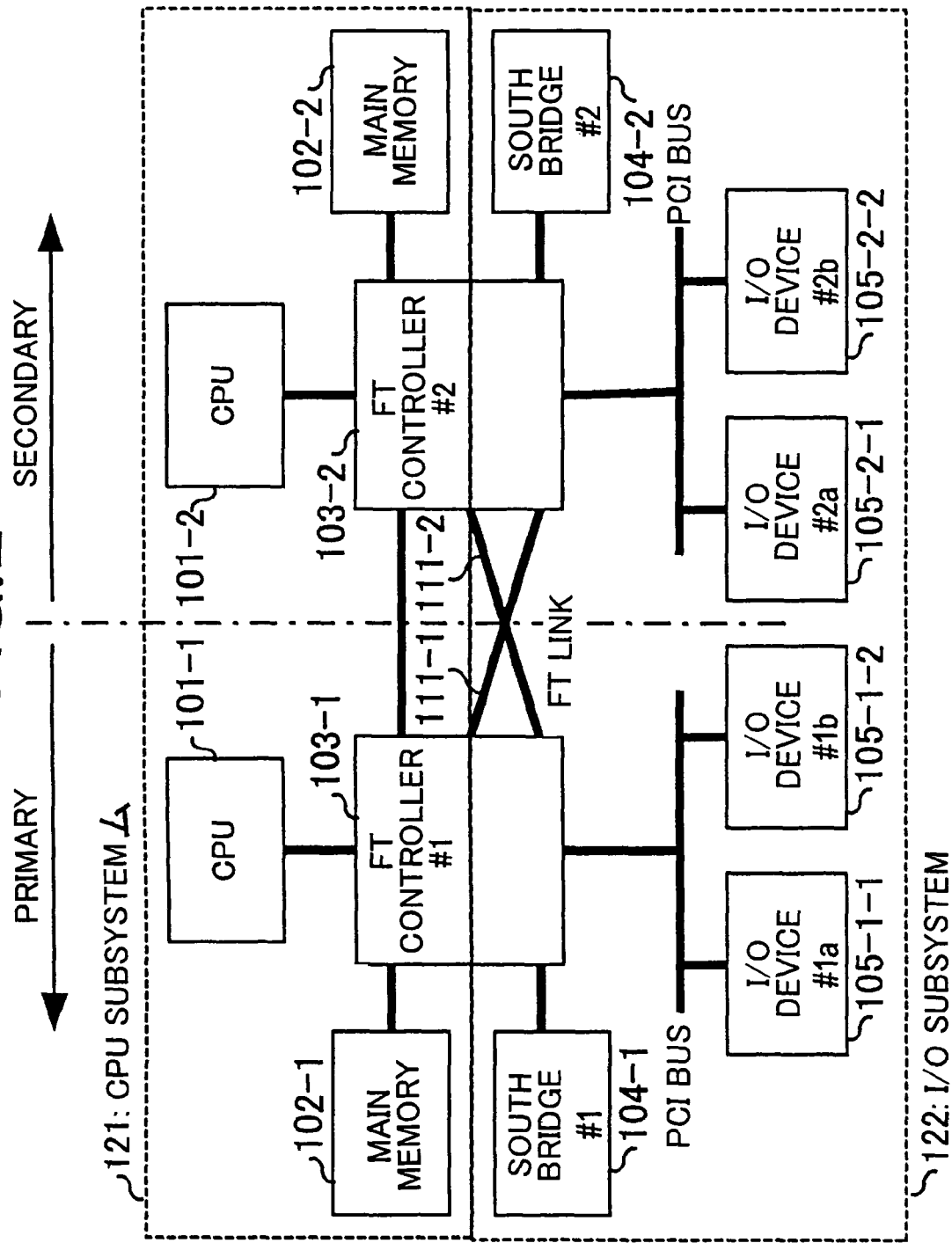
FIG. 2 is a block diagram showing a configuration of a fault tolerant computer according to an embodiment of the present invention.

FIG. 2 shows a basic configuration of the fault tolerance computer to realize the method and the system for resetting the fault tolerant computer according to an embodiment of the present invention.

The fault tolerant computer of FIG. 2 is a duplex system divided into primary and secondary sides for convenience. As devices, the primary and secondary sides are constructed on separate boards to enable switching of fault places.

A CPU subsystem 121 comprises a CPU group (including CPU's 101-1 and 101-2), main memories 102-1, 102-2, and upper halves of FT control sections 103-1, 103-2 including reset control sections, and operates in complete synchronization between the primary and secondary sides including clocks. The FT control section 103 is configured by adding a functional section for realizing the fault tolerant computer system to a north bridge functional section of Intel (registered trademark) architecture.

An I/O subsystem 122 is also divided into primary and secondary sides similar to each other in configuration. The I/O subsystem 122 includes an I/O device group. FIG. 2 shows an example in which the I/O device group of the primary side includes I/O devices 105-1-1, 105-1-2, and the I/O device group of the secondary side includes I/O devices 105-2-1, 105-2-2. The I/O devices are not operated in synchronization. In both I/O device groups, devices to be used are switched when faults occur.

I/O FT links 111-1 and 111-2 are set between the FT control sections 103-1 and 103-2. The I/O FT link 111-1 is mainly for accessing the I/O device of the secondary side from the CPU subsystem of the primary side. The I/O FT link 111-2 is mainly for accessing the I/O device of the primary side from the CPU subsystem of the secondary side. These can be used for other purposes.

Accordingly, access alone from the FT control section #1 (103-1) to the I/O devices #1a, b (105-1-1, 105-1-2) below is forwarded, and I/O access synchronous checking of both systems is limited within a range of I/O access forwarded to an I/O comparator 208-1 (see FIG. 4). Similarly, the FT control section #2 (103-2) is in charge of synchronous checking of access to the I/O devices #2a, b (105-2-1, 105-2-2) below an I/O comparator 208-2.

As a result, according to this system, synchronous checking of I/O access is discretely carried out between the primary and secondary sides.

Figure 3:
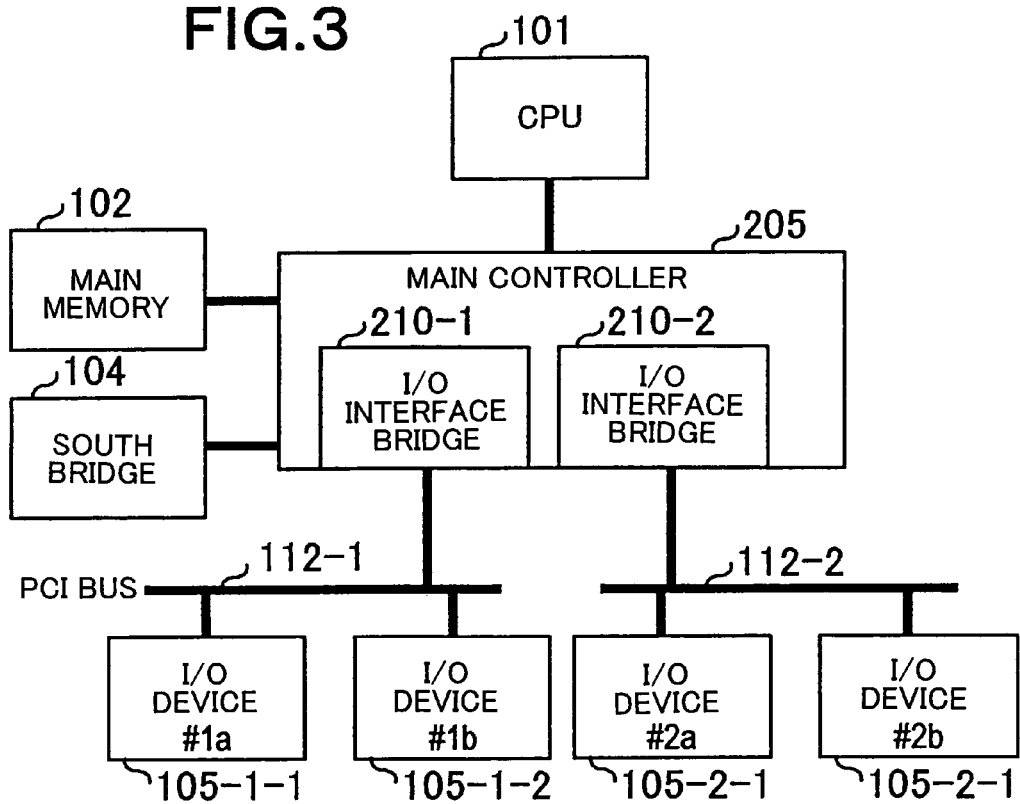
FIG. 3 is a block diagram showing the fault tolerant computer of FIG. 2 seen from one CPU.

FIG. 3 shows the system seen from one CPU of the system of FIG. 2. The CPU subsystem is duplexed. However, the I/O subsystem is configured as shown since it is duplexed for each device by software.

The FT control section 103-2 incorporates an I/O interface bridge 210-1, and the FT control section 103-2 incorporates an I/O interface bridge 210-2. The CPU 101-1 of the primary side accesses the I/O interface bridge 210-2 of the secondary side through the I/O FT link 111-1, and the CPU 101-2 of the secondary side accesses the I/O interface bridge 210-1 of the primary side through the I/O FT link 111-2.

Figure 4:
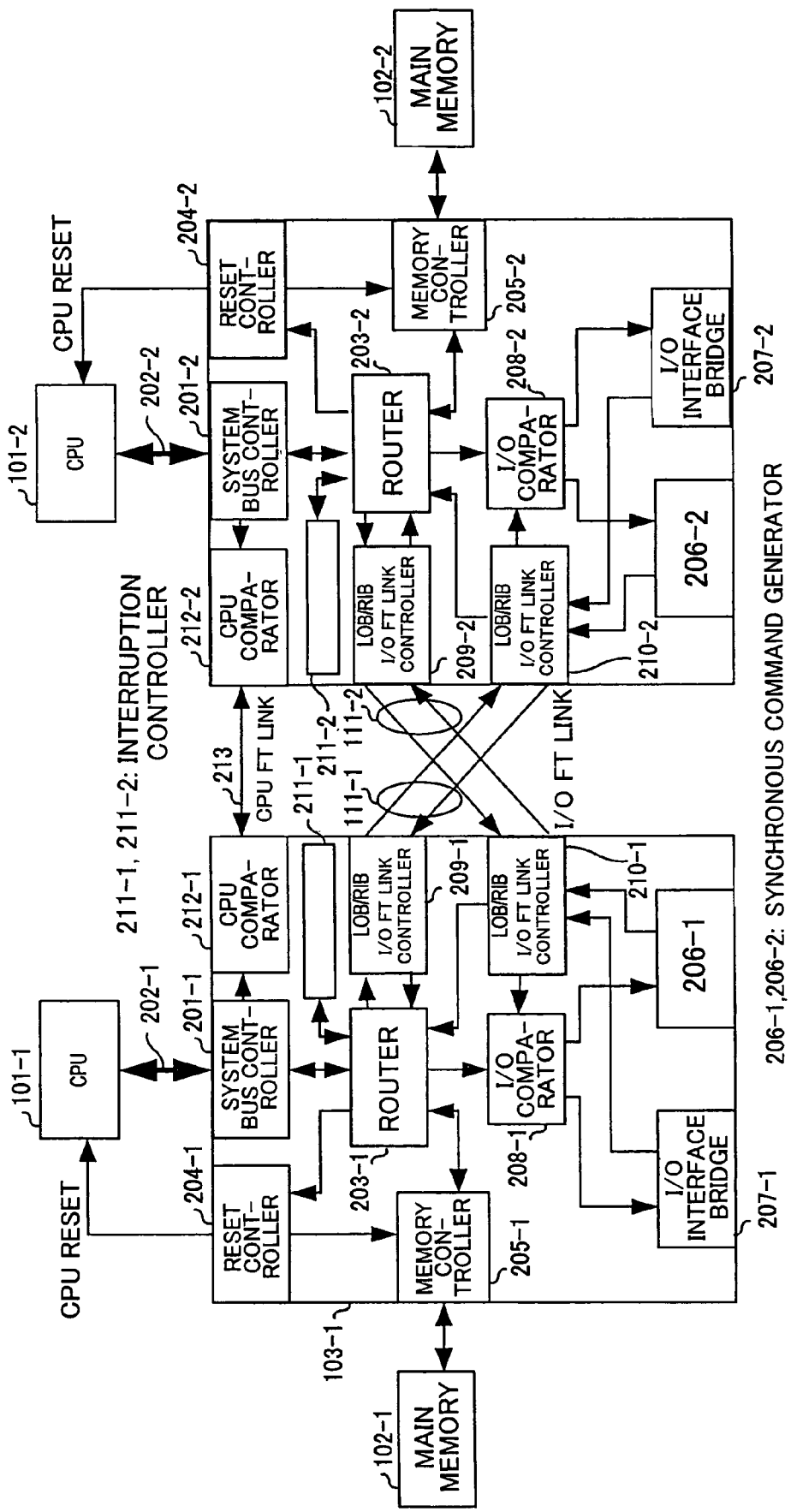
FIG. 4 is a block diagram showing a configuration of a fault tolerant control section shown in FIG. 2.

FIG. 4 shows the insides of the FT control sections 103-1, 103-2 in detail. Referring to FIG. 4, description will be made based on the primary side. However, description can be made based on the secondary side by changing a suffix "–1" of each section to "–2" and vice versa.

A system bus controller 201-1 executes control concerning a request from the CPU 101-1 through a system bus 202-1. The received request is sent to a router 203-1. Completion of an inbound request or an outbound request from the I/O device 105-1 is received from the router 203-1, and returned to the CPU 101-1. Generally, a request from the CPU to the I/O device is called an outbound request, and a request from the I/O device to the CPU/memory is called an inbound request. A reply accompanied by data to a nonposted request such as reading will be called completion, completion to the outbound request will be called outbound request completion, and completion to the inbound request will be called inbound request completion.

A reset controller 204-1 supplies a reset signal to the CPU 101-1, and gives a synchronous resetting instruction to a memory controller 205-1 in accordance with an instruction from the router 203-1.

The memory controller 205-1 executes DRAM control including issuance of a request to the main memory 102-1 based on a memory request routed from the router 203-1. In accordance with the synchronous resetting instruction from the reset controller 204-1, it instantaneously refreshes the DRAM, and clears a refreshing counter.

A synchronous command generator 206-1 is an I/O device in the FT control section 103-1, and issues a special command as an inbound request in accordance with an instruction from the CPU 101-1.

The synchronous command generator 206-1 issues a synchronous reset command of the CPU.

The router 203-1 routes a request and completion passed in the FT control section 103-1. Upon reception of a request from a requester, a routing destination is decided from an address written in the request, and the request is passed to the decided routing destination.

Routing destinations are the main memory 102-1, the CPU 101-1, a local (in own FT control section 103-1) I/O interface bridge 207-1, a remote (in FT control section 103-2 of an opposite side) I/O interface bride 207-2, the synchronous command generator 206-1, and the reset controller 204-1.

An address, a command and data are lumped together to facilitate synchronization, and the request and the completion are formed into packets to be routed in the FT control section 103-1 and in the I/O FT link 111-1. Hereinafter, the request and the completion will be simply referred to as packets.

The router 203-1 accepts all packets of similar formats. Packetization of each request or completion is carried out by a controller such as the system bus controller 201-1, the memory controller 205-1, the I/O interface bridge 207-1, the synchronous command generator 206-1, an LOB/RIB I/O FT link controller 208-1, or an LOB/RIB I/O FT link controller 209-1. The LOB is an abbreviation of a local outbound request, and the RIB is an abbreviation of a remote inbound request.

When the outbound request is routed to the I/O interface bridge 207-1, the router 203-1 routes the request to its own I/O comparator 208-1.

When the outbound request is routed to the remote I/O interface bridge 207-2, the request is passed to the LOB/RIB I/O FT link controller 209-1, and further sent through an ROB/RIB I/O FT link controller 210-2 of the remote side to the remote I/O interface bridge 207-2.

The inbound request from each I/O device 105-1 is passed through the I/O interface bridge 207-1 and the LIB/ROB I/O FT link controller 210-1 to the local router 203-1, or the remote router 203-2, or both.

The routing to the local router 203-1 and the remote router 203-2 vary depending on a synchronous or asynchronous state of the primary and secondary sides.

Figure 5:
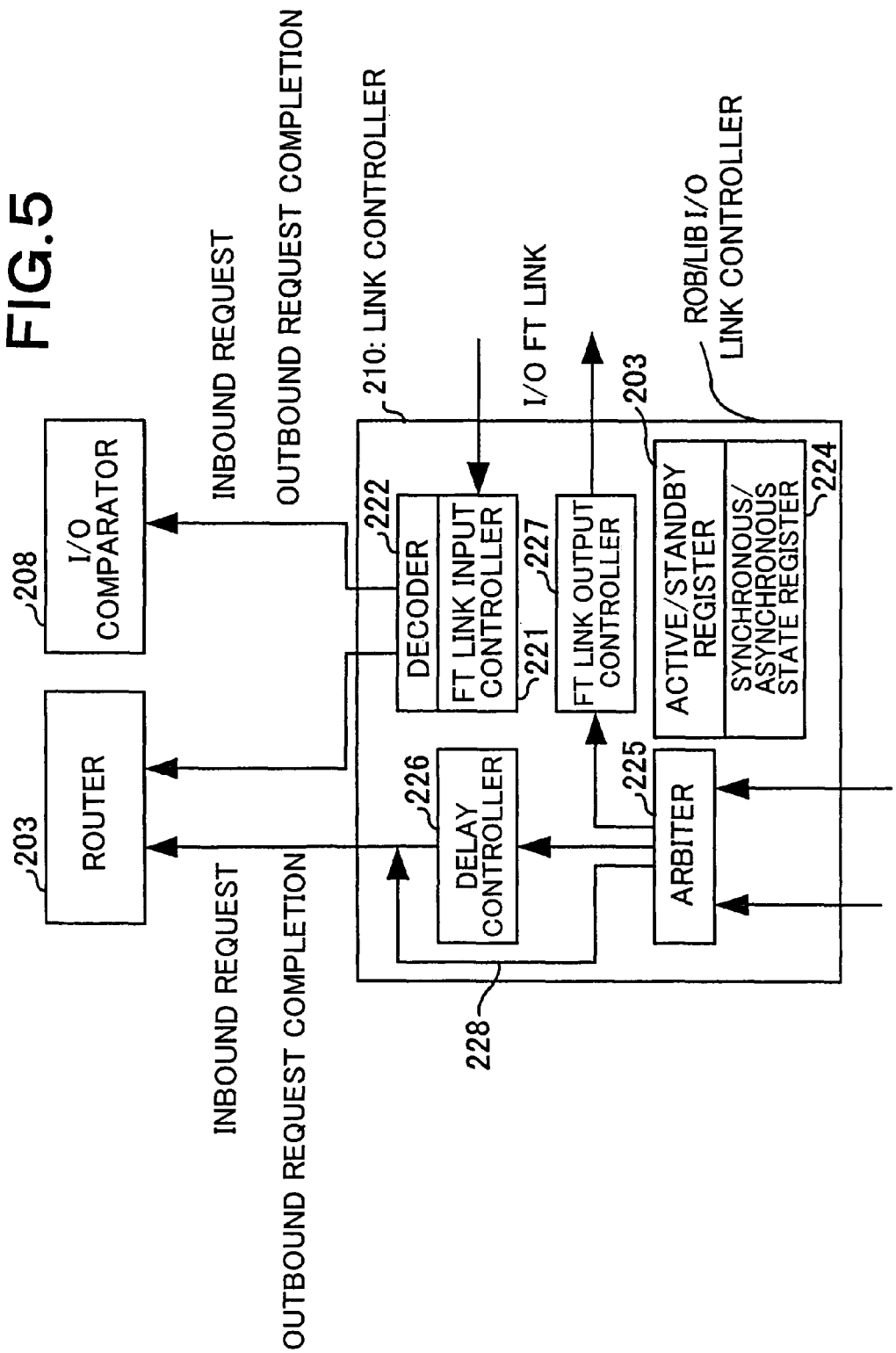
FIG. 5 is a block diagram showing a configuration of an LOB/RIB I/O FT link controller shown in FIG. 4.

FIG. 5 shows the inside of the LIB/ROB I/O FT link controller 210-1 in detail. The LIB/ROB I/O FT link controller 210-2 is similar to the LIB/ROB I/O FT link controller 210-1. Description will be made by taking the example of the LIB/ROB I/O FT link controller 210-1.

A packet received from the remote side is received by an FT link input controller 221, and decoded by a decoder 222 to determine a request/completion.

When it is determined to be an outbound request or inbound request completion, the packet received from the remote side is sent to the I/O comparator 208-1, and lastly forwarded through the I/O interface bridge 207-1 to each I/O device 105-1.

When it is determined to be an inbound request or an outbound request completion, the packet received from the remote side is sent to the router 203, and lastly forwarded to one of the CPU 101-1, the main memory 102-1, and the reset controller 204-1 which are devices in the CPU subsystem 121.

The following three types of routing are conceivable for the inbound request or the outbound request completion from the inside.

(1) The primary and secondary sides are in complete synchronization, and the inbound request or the outbound request completion is forwarded to both CPU subsystems. (2) The primary and secondary sides are not in synchronization, and the CPU subsystem connected to its own FT control section 103-1 is an active side while the CPU subsystem connected to the other FT control section 103-2 is a standby side. A request or completion from each of the local I/O interface bridge 207-1 and the remote I/O interface bridge 207-2 is forwarded only to its own CPU subsystem.

(3) The primary and secondary sides are not in synchronization, and the CPU subsystem connected to its own FT control section 103-1 is a standby side while the CPU subsystem connected to the other FT control section 103-2 is an active side. A request or completion from each of the local I/O interface bridge 207-1 and the remote I/O interface bridge 207-2 is forwarded only to the CPU subsystem of the remote side.

These states are set in an active/standby register 223 and a synchronous/asynchronous state register 224.

In the case of (1) in which both sides are in complete synchronization, the request or completion from the I/O device 105-2 is passed through an arbiter 225, and then sent to both of a delay controller 226 and an FT output link controller 227. As a result, the request or completion from the I/O device 105-2 is passed to the routers 203-1, 203-2 of both FT control sections 103-1, 103-2. However, in the fault tolerant computer, the CPU subsystems including the routers 203-1, 203-2 are in complete synchronization. Accordingly, the request or completion from the I/O device 105-2 must be passed to the routers 203-1, 203-2 in complete synchronization.

As the packet is forwarded to the other system through the I/O FT link 111-2, a certain time lag occurs. Thus, when the packet is passed to an own router 203-1, it goes through the delay controller 226. This time lag is called a flight time.

The LIB/ROB I/O link controller 209 includes the FT link input controller 221 and the FT link output controller 227 alone among components of the LIB/ROB I/O FT link controller 210.

Figure 6:
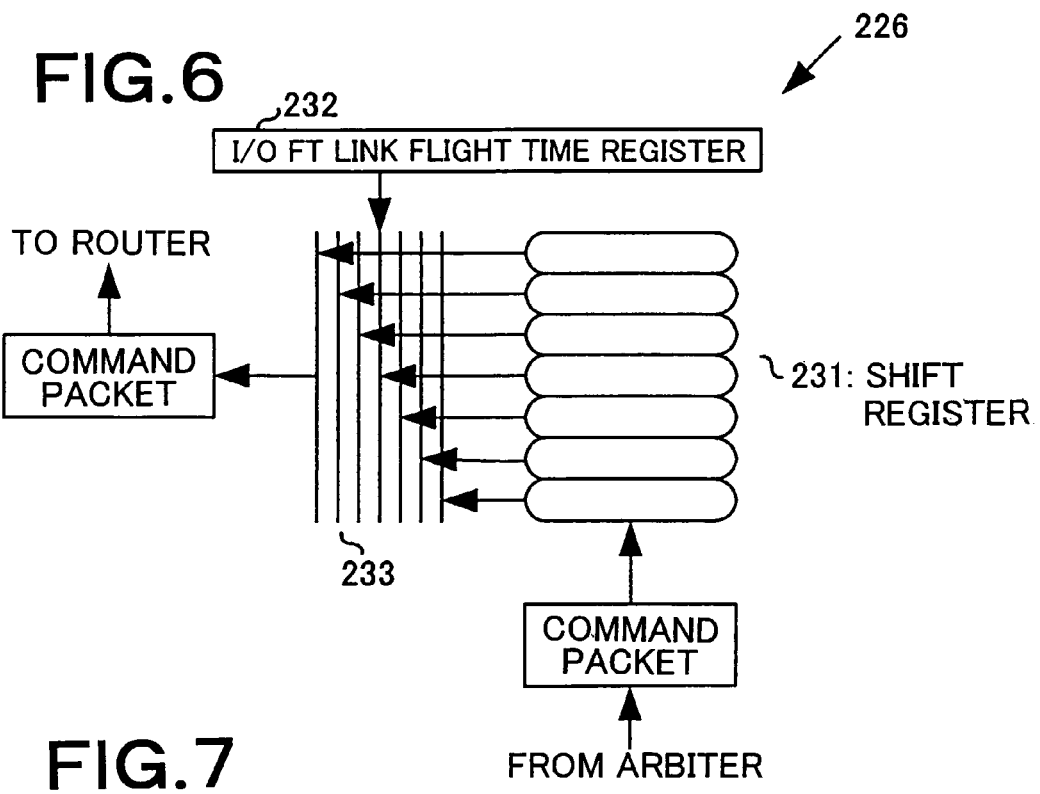
FIG. 6 is a block diagram showing a configuration of a delay controller shown in FIG. 5.

FIG. 6 shows the delay controller in detail.

The packet of the request or completion passed through the arbiter 225 is stored in a shift register 231 of an FIFO configuration shifted for each clock.

A switch 233 selects a request or completion from a node corresponding to a flight time stored in an I/O FT link flight time register 232 from a plurality of nodes of the shift register 231, and passes it to the router 203-1.

That is, the request or completion passed to the router 203-1 is delayed by a time (flight time) equal to that of the request or completion passed through the I/O FT link 111-2 to the router 203-2.

The flight time depends on mounting. For example, a flight time is measured in a mounted state at the time of shipment from a plant, and the measured flight time is stored in a predetermined area (EEPROM or the like), and set in the I/O FT link flight time register at the time of starting the system.

By the aforementioned function, in the synchronous state, the packet of the inbound request or the outbound request completion is passed to the routers 203-1, 203-2 at the same timing.

Figure 7:
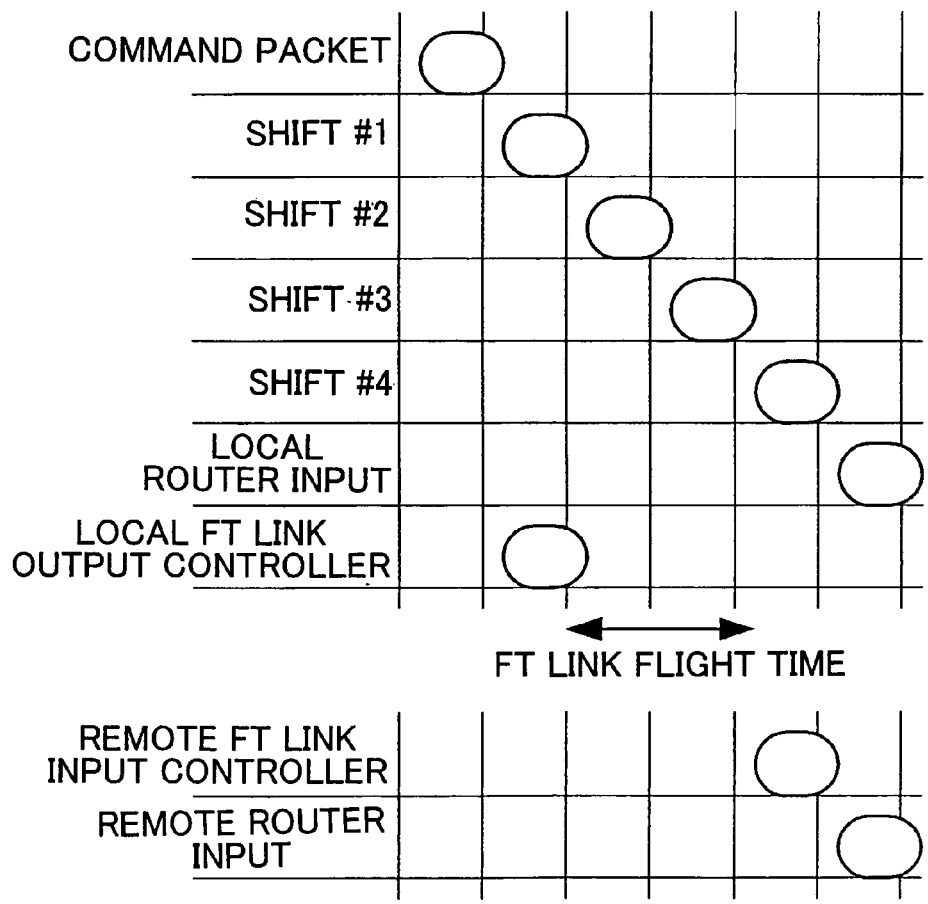
FIG. 7 is a timing chart showing a situation in which command packets simultaneously arrive at a local router and a remote router according to the embodiment of the present invention.

FIG. 7 is a timing chart when a time flight is 4T. The packet output from the local FT link output controller 227 is synchronized with a clock at the remote FT link input controller 222. Accordingly, a flight time is an integral multiple of a clock cycle T.

When the primary and secondary sides are in an asynchronous state and the primary side is active (2), as indicated by a reference numeral 228 of FIG. 5, the packet is not passed to the FT link output controller 227 but directly forwarded from the arbiter 225 to the router 203.

Conversely, when the primary and secondary sides are in an asynchronous state and the secondary side is active (3), the CPU subsystem of its own system is set in a standby state to be cut off from the system. Thus, the packet is forwarded only to the FT link output controller 227.

Figure 8:
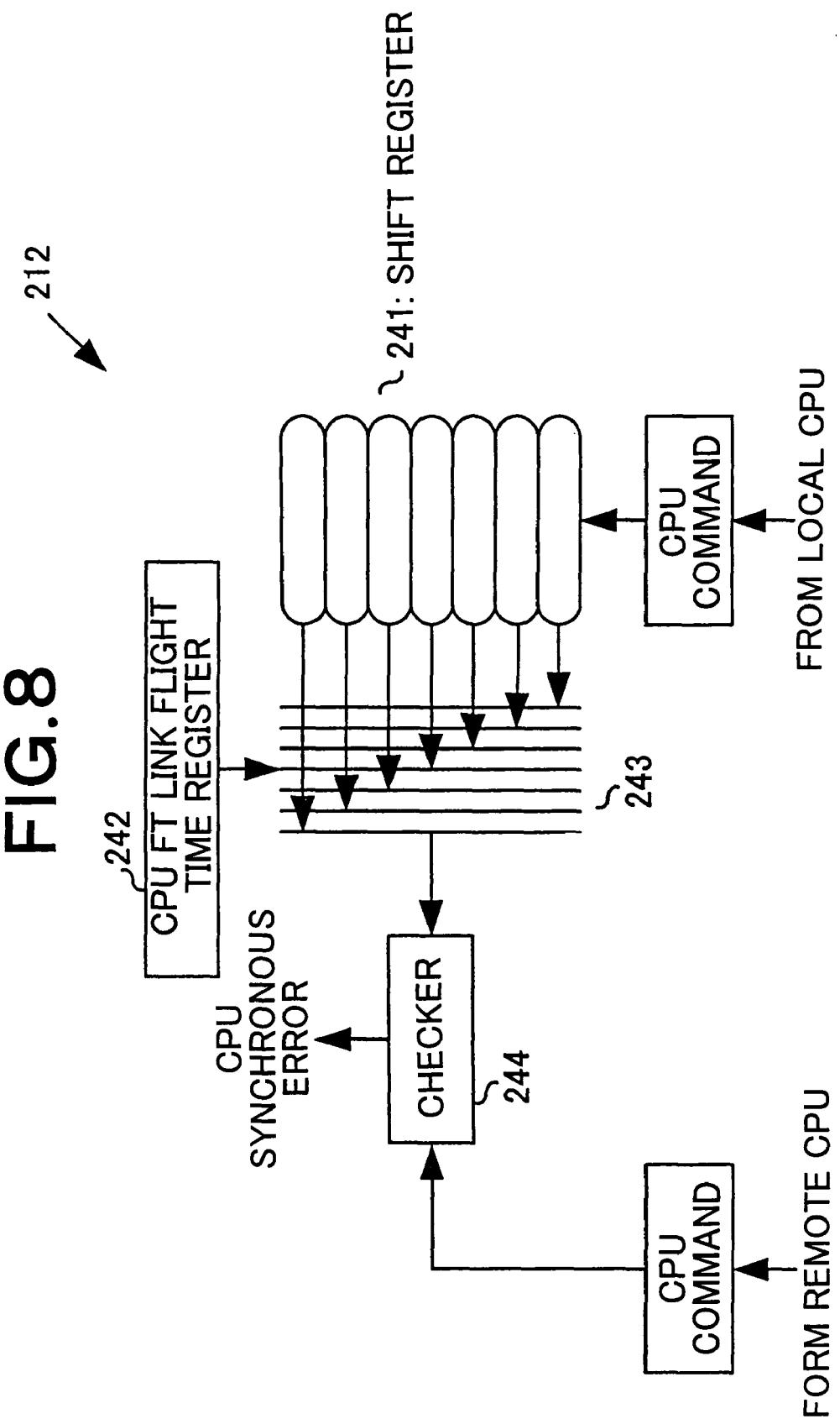
FIG. 8 is a block diagram showing a configuration of a CPU comparator shown in FIG. 4.

The CPU comparators 212-1, 212-2 connect their CPU subsystems to each other through the CPU FT link 213, transfers request information issued by the CPU's with each other, and checks synchronism. FIG. 8 shows these sections in detail.

The CPU comparator 212 includes a delay controller (constituted of shift register 241, CPU FT link flight time register 242 and switch 243) similar to the delay controller (constituted of shift register 231, I/O FT link flight time register 232 and switch 233) for maintaining synchronism with the I/O FT link. A command of the CPU 101-1 of its own system is stored in the shift register of an FIFO configuration for executing shifting for each clock, taken out from the shift register 241 by the switch at timing set in the CPU FT link flight time register 242, and passed to a checker 244.

This flight time also depends on mounting. For example, a flight time is measured in a mounted state at the time of shipment from the plant, and the measured time is stored in a predetermined area (EEPROM or the like), and set in the CPU FT link flight time register 242 at the time of starting the system.

The checker 244 receives a CPU command of the remote system through the CPU FT link 213. The checker 244 monitors issuance of identical CPU commands from the primary and secondary sides at the same timing.

This function is mainly used for checking synchronism of the CPU's immediately after CPU reset releasing. When a synchronization failure of the CPU's by reset releasing is confirmed by the checker 244, the failure is immediately announced to the local reset controller 204 to prompt resetting of the CPU again.

The I/O interface bridge 207-1 has a function of forwarding a packet to a lower I/O interface, or a function of packetizing a request or completion from the lower I/O device 105-1 to forward it to the LIB/RIB I/O FT link controller 210-1.

When both systems are synchronized by resetting the CPU's 101-1, 101-2, the I/O devices 105-1-1, 105-1-2, 105-2-1, and 105-2-2 must be temporarily stopped.

For example, it is because when an interruption or DMA occurs from the I/O device 105-1-1 during resetting of the CPU's 101-1, 101-2, the CPU's 101-1, 101-2 cannot deal with it. However, a stop time must be short. It is because a long-time stop of the system means a stop of services, inconveniencing the user.

For the CPU's 101-1, 101-2, system software such as a system management interruption handler (SMI hander) higher than the operating system is accessed to enable a temporary stop of the operating system. Additionally, control for synchronous processing is carried out by software accessed by an SMI generated by the interruption controllers 221-1, 211-2.

However, system software unaware of a nature of each I/O device 105 cannot stop the I/O device 105 as it is unable to control the same.

Generally, control of the I/O device 105 is carried out by an I/O device driver present for each I/O device through an interface of the operating system. Accordingly, to stop the I/O device 105, a driver of each I/O device 105 must be accessed to request a stop of the device each time.

After completion of synchronization, the driver of each I/O device 105 must similarly be accessed to start an operation of the device.

This is after all equivalent to a stop of all services for synchronization, meaning a long-time stop of the system.

To prevent such a problem, according to the system, the I/O interface bridge 207 is provided with a locking function.

The I/O interface bridge 207 stores all nonposted outbound requests (requests requiring completion) issued to the I/O devices 105, receives completion, packetizes it, and clears the requests when the packet is passed to the LOB/RIB I/O FT link controller 210.

Upon reception of a lock packet as an outbound request from the CPU 101 engaged in system software execution, the I/O interface bridge 207 cuts off all inbound requests when all the prepared nonposted requests are cleared, and returns lock completion to the router 203.

That is, after the I/O interface bridge 207 receives the lock packet, the lock packet becomes a last inbound packet sent from the I/O interface bridge 207.

Accordingly, all the packets from the I/O interface bridge 207 are cut off to temporarily stop the I/O device 105.

After the synchronization, an unlocking command is issued from the CPU 102 engaged in BIOS execution to release a locked state.

As a result, since the I/O interface is capped only during reset synchronization without stopping each I/O device 105, it is possible to shorten a time more greatly as compared with the case of accessing the device driver to stop/start the system.

In the system of FIG. 2, it is presumed that both systems are in an asynchronous state, the primary side is active, and services are operated by the operating system. It is presumed that the secondary side is in a standby state, and services by the CPU 101-2 are stopped by board switching due to a fault.

It is further presumed that the I/O FT links 111-1, 111-2 have been set in operated states, and the I/O device 105-2 of the standby side can be used from the active side.

In this case, the synchronous/asynchronous state register 24 is set to indicate asynchronism, and the active/standby register 223 of the primary side is active while the active/standby register 223 of the secondary side is in a standby state.

Therefore, no packet reaches the router 203-2 of the CPU subsystem of the secondary side in the standby state from the active side, and the router 203-2 rejects all the outbound requests from the standby side, logically setting a cut-off state.

An operation procedure of operating the primary and secondary sides in synchronization from this state will be described with reference to FIGS. 9 to 11.

To synchronize the standby side, system software (e.g., SMI handler) is accessed by an interruption (e.g., SMI) higher than the operating system. At a point of this time, an operation of the operating system is temporarily stopped.

Figure 9:
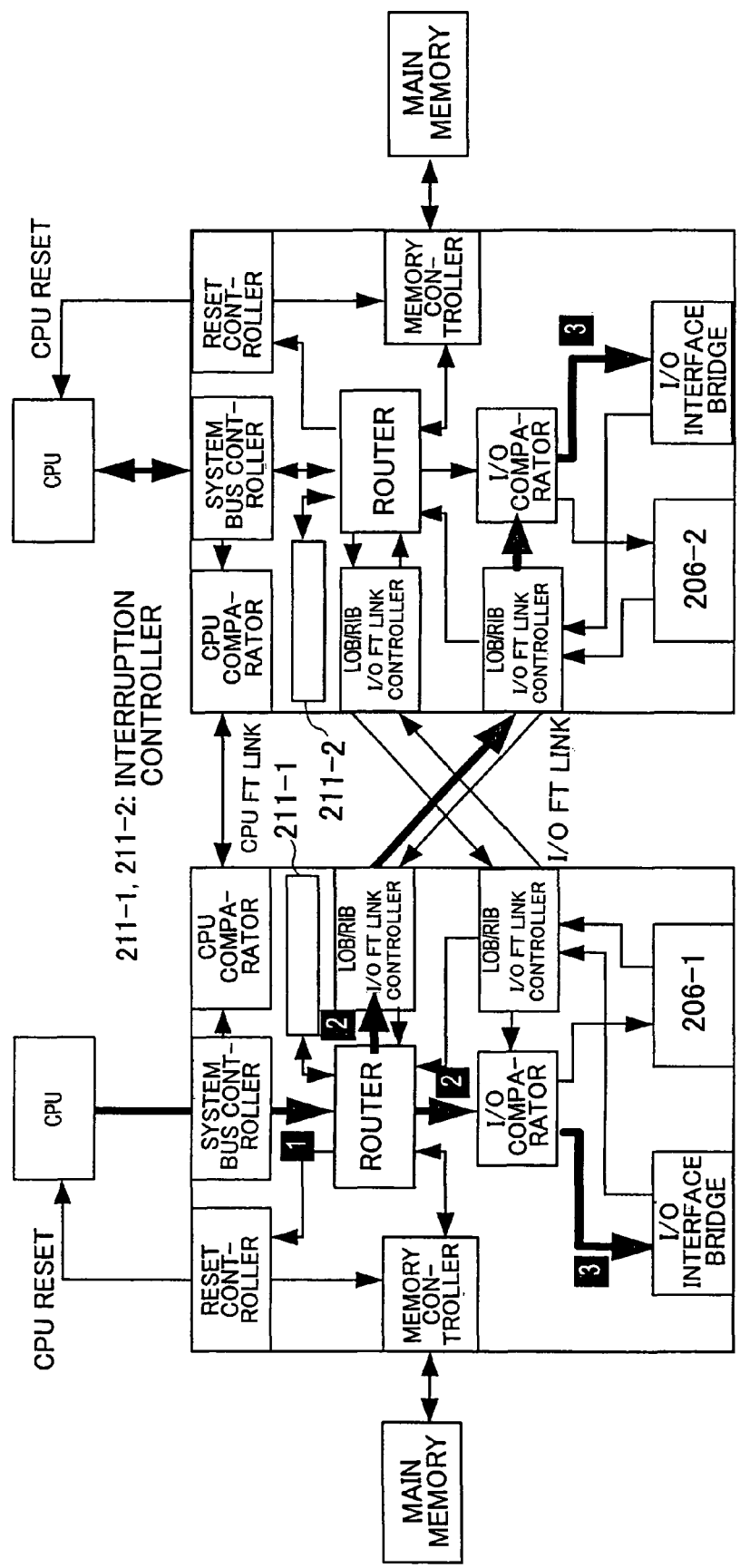
FIG. 9 is a first explanatory diagram of a CPU resetting method according to the embodiment of the present invention.

The CPU 101-1 that executes the system software requests the router 203-1 to issue a locking command (1 of FIG. 9).

The router 203-1 issues locking commands to the I/O interface bridges 207-1, 207-2 of both local and remote sides (2 of FIG. 9).

The I/O interface bridges 207-1, 207-2 that have received the locking commands (3 of FIG. 9) return nonposted outbound request completion to all the prepared nonposted outbound requests, and simultaneously lock all the inbound requests from the I/O devices 105-1, 105-2. Then, the I/O interface bridges 207-1, 207-2 return lock completion after returning of last nonposted outbound request completion (4 of FIG. 10).

Figure 10:
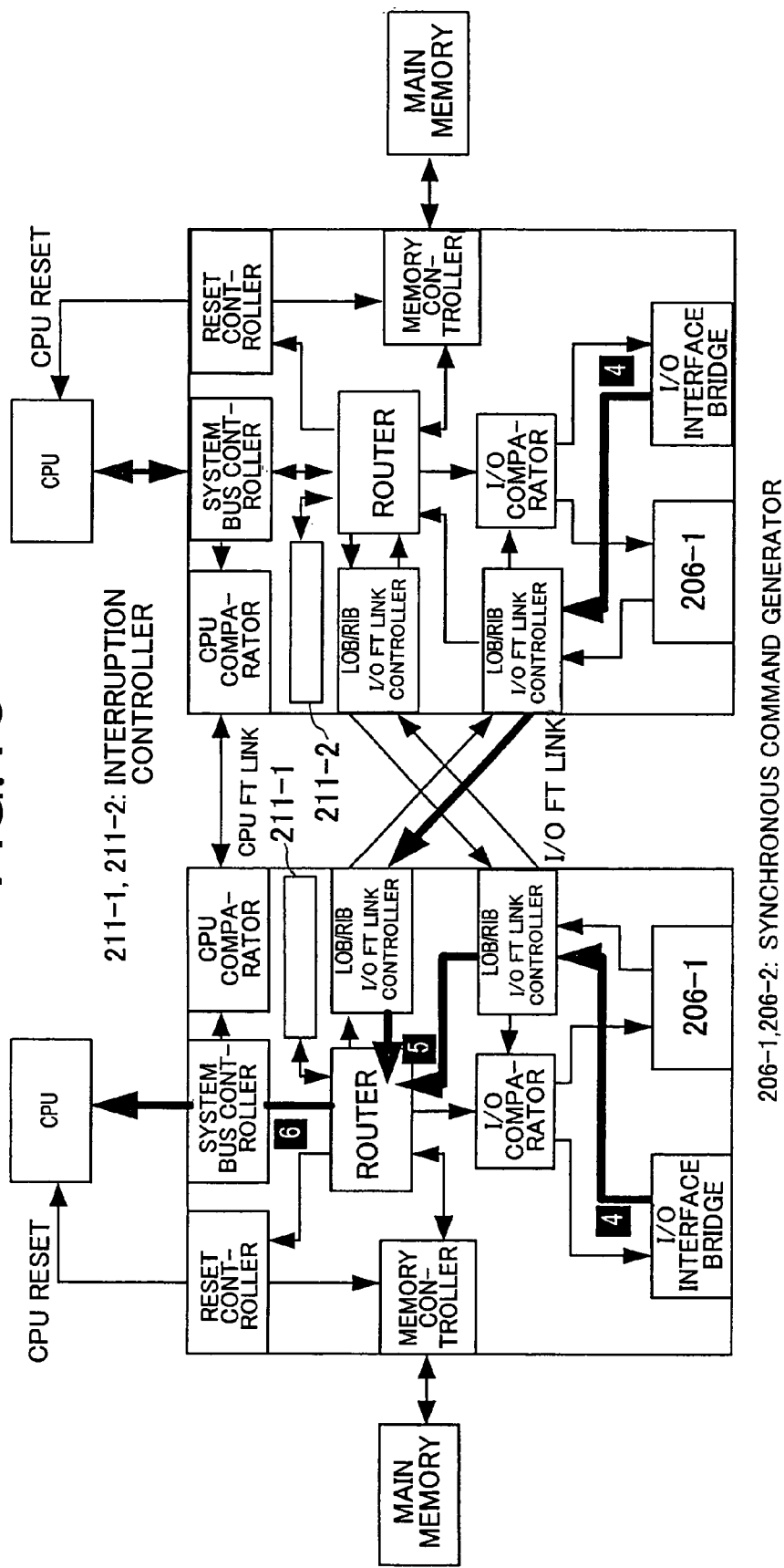
FIG. 10 is a second explanatory diagram of a CPU resetting method according to the embodiment of the present invention.

The router 203-1 checks the return of lock completion from both I/O interface bridges 207-1, 207-2 (5 of FIG. 10) to announce it to the CPU 101-1 (6-FIG. 10).

As an announcing method to the CPU 101-1, an announcement is made by polling the register in the router 203-1 indicating a lock completion returned state by the CPU 101-1 which executes the system software.

Though not described in detail in the embodiment, contents of the main memory 102-1 of the active side are continuously copied in the main memory 102-1 of the standby side by an internal DMA engine of the FT control section 103-1, which is carried out in the background during the operation of the operating system.

During the period from the start of the system software for synchronous processing to the stop of DMA from the I/O devices 105-1, 105-2 to the main memory 102-1 by locking of the I/O interface brides 207-1, 207-2, contents written in the memory 102-1 of the active side by the DMA are forwarded to the memory 102-2 of the standby side, providing a function of automatically maintaining sameness.

That is, at a point of time when the router 203-1 checks the return of lock completion from both I/O interface bridges 207-1, 207-2 (5 of FIG. 10), and announces it to the CPU 101-1, the main memories 102-1, 102-2 connected to both FT control sections 103-1, 103-2 are in completely the same state.

Next, the CPU 101-1 that executes the system software requests the synchronous command generator 206-1 to issue a synchronous CPU reset command. This is carried out by writing in a control register of the synchronous command generator 206-1 (7 of FIG. 11).

Figure 11:
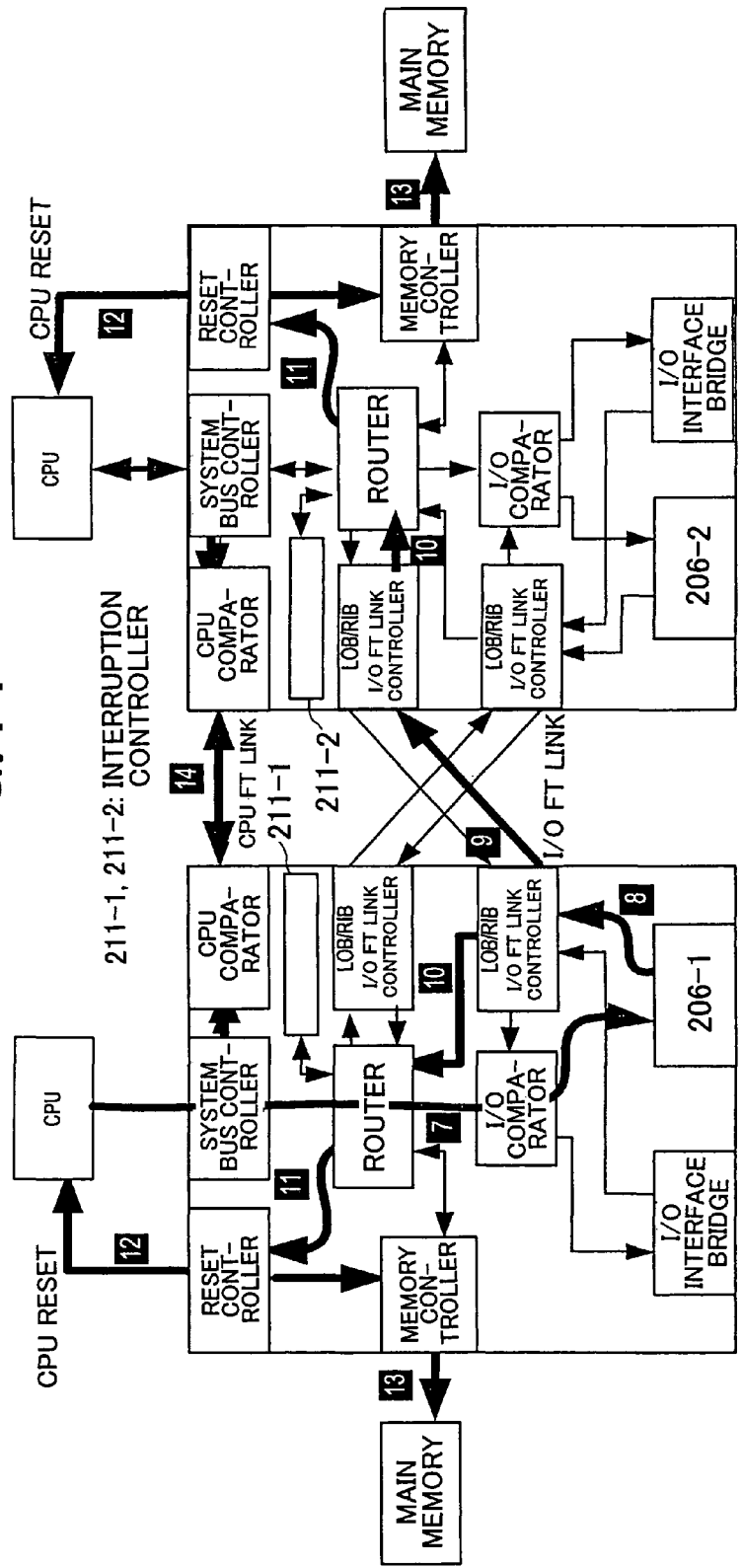
FIG. 11 is a third explanatory diagram of a CPU resetting method according to the embodiment of the present invention.

The synchronous command generator 206-1 announces a packet of the synchronous CPU reset command to the LIB/ROB I/O FT link controller 210-1 (8 of FIG. 11).

Upon reception of the synchronous CPU reset command, the LIB/ROB I/O FT link controller 210-1 automatically switches the synchronous/asynchronous state register 224.

Accordingly, the primary and secondary sides are considered to be in the middle of a synchronizing operation, and the synchronous CPU reset command is forwarded to the delay controller 226 and the I/O FT link output controller 227 (9 of FIG. 11).

Because of the passages through the delay controller 226 of the active side and the I/O FT link 111-2 of the standby side, the synchronous CPU reset commands simultaneously arrive at the routers 203-1, 203-2 (10 of FIG. 11).

The routers 203-1, 203-2 respectively forward the synchronous CPU reset commands to the reset controllers 204-1, 204-2 (11 of FIG. 11). The reset controllers 204-1, 204-2 respectively assert resets to the CPU's 101-1, 101-2 for certain periods (12 of FIG. 11). As sections above the routers 203-1, 203-2 operate in complete synchronization, CPU resets are simultaneously applied.

The reset controllers 204-1, 204-2 respectively send synchronous reset pulses to the memory controllers 205-1, 205-2.

As shown in a timing chart of FIG. 12, the memory controllers 205-1, 205-2 that have received the synchronous reset pulses issue refreshing commands to DRAM's as the main memories 102-1, 102-2, and reset the DRAM refreshing counters (13 of FIG. 11). To reset the DRAM refreshing counters, DRAM refreshing counter reset signals are applied from the memory controllers 205-1, 205-2 to the main memories 102-1, 102-2.

Accordingly, there are no more sections which asynchronously operate in both CPU subsystems, setting a complete lock step synchronous state.

After reset releasing of the CPU's 101-1, 101-2, the CPU comparators 212-1, 212-2 start to operate, thereby monitoring issuance timing of requests of both CPU's 101-1, 101-2 (14 of FIG. 11).

As described above, the resetting of the CPU's 101-1, 101-2 are asynchronous resetting in many cases, and the re-resetting function that uses the CPU comparators 212-1, 212-2 is provided in consideration of a case in which the CPU's 101-1, 101-2 are not synchronized with each other even when reset pulses synchronized with a clock are applied thereto.

As shown in FIG. 13, when a timing shift occurs in a nearby request after the reset releasing, the CPU comparators 212-1, 212-2 simultaneously detect an error. The CPU comparators 212-1, 212-2 immediately announce the error to the reset controllers 204-1, 204-2. As a result, the sequence of the synchronous CPU resetting is started again from the place indicated by 12 of FIG. 11.

The resynchronous resetting of the CPU's 101-1, 101-2 by CPU comparator checking is a function of executing fast resynchronization only at a ROM fetching stage by BIOS before main memory access.

Upon successful synchronization, ROM fetching of BIOS in addresses indicated by reset vectors of the CPU's 101-1, 101-2 is continued. Knowing that a result of the CPU comparator checking is positive and the resynchronization processing has been successful, to unlock the I/O interface bridges 207-1, 207-2, the CPU's 101-1, 101-2 that execute BIOS request the routers 203-1, 203-2 to issue unlocking commands. This is carried out by writing in the control registers of the routers 203-1, 203-2.

The I/O interface bridges 207-1, 207-2 that have received the unlocking commands release the locked states. Thus, the I/O devices 105-1, 105-2 start to operate again.

The BIOS itself accesses the system software by SMI, executes context returning to return before a stop of the operating system, and then returns in a form of return from the SMI before a stop to complete the synchronization processing.

What is claimed is:

1. A method of resetting a fault tolerant computer equipped with a plurality of modules, comprising:
   a step of generating a reset requesting signal by a first module;
   a step of dividing the reset requesting signal to first and second reset requesting signals;
   a step of transmitting the second reset requesting signal from said first module to a second module;
   a step of delaying the first reset requesting signal in the first module by a measured and register stored time required for transmitting the second reset requesting signal to the second module;
   a step of resetting at least one CPU included in the first module by a first CPU reset signal generated based on the first reset requesting signal delayed in the first module; and
   a step of resetting at least one CPU included in the second module by a second CPU reset signal generated based on the second reset requesting signal transmitted to the second module.

2. The method according to claim 1, further comprising:
   a step of generating a locking command in the first module;
   a step of transmitting the locking command to an I/O interface bridge of the first module;
   a step of transmitting the locking command to an I/O interface bridge of the second module;
   a step of locking an inbound request and generating a first locking completion upon completion of returning of a nonposted outbound request completion corresponding to all nonposted outbound requests before the locking command is received in the I/O interface bridge of the first module which has received the command; and
   a step of locking an inbound request and generating a second locking completion upon completion of returning of a nonposted outbound request completion corresponding to all nonposted outbound requests before the locking command is received in the I/O interface bridge of the second module which has received the locking command,
   wherein the reset requesting signal is generated upon generation of the first locking completion in the I/O interface bridge of the first module and the second locking completion in the I/O interface bridge of the second module.

3. The method according to claim 1, comprising:
   a step of refreshing a main memory of the first module by a refreshing command and a refreshing counter reset signal generated based on the first reset requesting signal delayed in the first module; and
   a step of refreshing a main memory of the second module by a refreshing command and a refreshing counter reset signal generated based on the second reset requesting signal transmitted to the second module.

4. The method according to claim 1, further comprising:
   a step of determining matching of a command issued by at least one reset CPU included in the first module with a command issued by at least one reset CPU included in the second module; and
   a step of resetting at least one CPU included in the first module and at least one CPU included in the second module again when the commands do not match with each other.

5. The method according to claim 4, further comprising:
   a step of transmitting the command issued by at least one reset CPU included in the second module to the first module; and
   a step of delaying the command issued by at least one reset CPU included in the first module by a time required for transmitting the command from the second module to the first module,
   wherein in the step of determining matching of the command issued by at least one reset CPU included in the first module with the command issued by at least one reset CPU included in the second module, determination is made as to matching of the command issued by at least one reset CPU included in the first module and delayed with the command issued by at least one reset CPU included in the second module and transmitted.

6. The method of claim 1, wherein a module is comprised of at least one CPU and a communication interface configured to receive a reset signal from another module.

7. A system for resetting a fault tolerant computer equipped with a plurality of modules, comprising:
   means for generating a reset requesting signal by a first module;
   means for dividing the reset requesting signal to first and second reset requesting signals;
   means for transmitting the second reset requesting signal from said first module to a second module;
   means for delaying the first reset requesting signal in the first module by a measured and register stored time required for transmitting the second reset requesting signal to the second module;
   means for resetting at least one CPU included in the first module by a first CPU reset signal generated based on the first reset requesting signal delayed in the first module; and
   means for resetting at least one CPU included in the second module by a second CPU reset signal generated based on the second reset requesting signal transmitted to the second module.

8. The system according to claim 7, comprising:
means for generating a locking command in the first module;
means for transmitting the locking command to an interface bridge of the first module;
means for transmitting the locking command to an interface bridge of the second module;
means for locking an inbound request and generating a first locking completion upon completion of returning of a nonposted outbound request completion corresponding to all nonposted outbound requests before the locking command is received in the interface bridge of the first module which has received the locking command; and
means for locking an inbound request and generating a second locking completion upon completion of returning of a nonposted outbound request completion corresponding to all nonposted outbound requests before the locking command is received in the interface bridge of the second module which has received the locking command,
wherein the reset requesting signal is generated upon generation of the first locking completion in the interface bridge of the first module and the second locking completion in the interface bridge of the second module.

9. The system according to claim 7, comprising:
means for refreshing a main memory of the first module by a refreshing command and a refreshing counter reset signal generated based on the first reset requesting signal delayed in the first module; and
means for refreshing a main memory of the second module by a refreshing command and a refreshing counter reset signal generated based on the second reset requesting signal transmitted to the second module.

10. The system according to claim 7, further comprising:
means for determining matching of a command issued by at least one reset CPU included in the first module with a command issued by at least one reset CPU included in the second module; and
means for resetting at least one CPU included in the first module and at least one CPU included in the second module again when the commands do not match with each other.

11. The system according to claim 10, further comprising:
means for transmitting the command issued by at least one reset CPU included in the second module to the first module; and
means for delaying the command issued by at least one reset CPU included in the first module by a time required for transmitting the command from the second module to the first module,
wherein in the means for determining matching of the command issued by at least one reset CPU included in the first module with the command issued by at least one reset CPU included in the second module, determination is made as to matching of the command issued by at least one reset CPU included in the first module and delayed with the command issued by at least one reset CPU included in the second module and transmitted.

12. The system of claim 7, wherein a module includes receiving means for receiving a reset signal from another module.

13. A fault tolerant controller in a first module used for a fault tolerant computer equipped with a plurality of modules, comprising:
reset requesting signal generation means for generating a reset requesting signal;
dividing means for dividing the reset requesting signal to first and second reset requesting signals;
transmission means for transmitting the second reset requesting signal to a fault tolerant controller included in a second module;
first delaying means for delaying the first reset requesting signal by a measured and register stored time required for transmitting the second reset requesting signal to the fault tolerant controller included in the second module; and
CPU resetting means for resetting at least one CPU included in the first module by a first CPU reset signal generated based on the delayed first reset requesting signal.

14. The fault tolerant controller according to claim 13, further comprising:
locking command generation means for generating a locking command;
first locking command transmission means for transmitting the locking command to an interface bridge included in the fault tolerant controller of the first module;
second locking command transmission means for transmitting the locking command to an interface bridge included in the fault tolerant controller included in the second module; and
first locking completion generation means for locking an inbound request and generating a first locking completion upon completion of returning of a nonposted outbound request completion corresponding to all nonposted outbound requests before the locking command is received in the interface bridge included in the fault tolerant controller of the first module;
second locking completion generation means for locking an inbound request and generating a second locking completion upon completion of returning of a nonposted outbound request completion corresponding to all nonposted outbound requests before the locking command is received in the interface bridge included in the fault tolerant controller of the second module;
wherein the reset requesting signal generation means generates the reset requesting signal upon generation of the first locking completion in the interface bridge included in the fault tolerant controller of the first module and the second locking completion in the interface bridge included in the fault tolerant controller of the second module.

15. The fault tolerant controller according to claim 13, further comprising:
refreshing means for refreshing a main memory of the first module by a refreshing command and a refreshing counter reset signal generated based on the first reset requesting signal delayed by the first delaying means.

16. The fault tolerant controller according to claim 13, further comprising:
matching determination means for determining matching of a command issued by at least one reset CPU included in the first module with a command issued by at least one reset CPU included in the second module; and
re-resetting means for resetting at least one CPU included in the first module again when the commands do not match with each other.

17. The fault tolerant controller according to claim 16, further comprising:
second delaying means for delaying the command issued by at least one reset CPU included in the first module by a time required for transmitting the command from the second module to the first module, wherein the matching determination means determines matching of the command issued by at least one reset CPU included in the first module and delayed by the second delaying means with the command issued by at least one reset CPU included in the second module and transmitted.

18. The fault tolerant controller of claim 13, wherein a module includes receiving means for receiving a reset signal from another module.

* * * * *